3,819,727
PROCESS FOR THE SYNTHESIS OF ALCOHOLS

Giuseppe Ferrari and Pier Luigi Griselli, Ferrara, Italy, assignors to Montecatini Edison S.p.A., Milan, Italy
No Drawing. Filed Apr. 22, 1971, Ser. No. 136,562
Claims priority, application Italy, Apr. 23, 1970, 23,755/70
Int. Cl. C07c 28/16
U.S. Cl. 260—638 HF    8 Claims

ABSTRACT OF THE DISCLOSURE

Alcohols are directly synthesized from olefins by oxo-reaction in a process comprising a hydroformylation phase and a hydrogenation phase in which both phases proceed in the presence of an oxo-reaction catalyst, more particularly cobalt carbonyls or carbonylable cobalt salts, and the hydrogenation phase is carried out in the presence of from 5% to 15% by volume of water, based on the volume of the olefin, and, optionally, in the presence of an organic acid.

THE PRIOR ART

It is known to react olefins with carbon monoxide and hydrogen in the presence of catalysts containing metals, in particular cobalt, under suitable temperature and pressure conditions, to obtain the corresponding aldehydes, which may thereafter be hydrogenated to the corresponding alcohols in contact with known hydrogenation catalysts.

It is also known to hydrogenate the aldehydes to alcohols under hydroformylation conditions, in contact with a catalyst as used in the synthesis of the aldehyde.

However, said process has the drawback that the alcohol yields are unsatisfactory due to the formation of substantial amounts of undesired by-products, such as esters, acids and, in general, condensation products of molecular weight higher than desired.

THE PRESENT INVENTION

One object of this invention was to provide a process for the direct synthesis of alcohols from olefins and free of the drawbacks and disadvantages of the known processes.

Another object was to provide a process for obtaining the alcohols in high yields.

These and other objects are achieved by the present invention in accordance with which a process has been found for the dircet synthesis of alcohols by oxo-reaction, and starting from olefins, CO and $H_2$. The process comprises a hydroformylation phase and a hydrogenation phase, the catalyst used in both phases being the same, and is characterized in that the hydrogenation phase is carried out in the presence of from 5% to 15% by volume of water, based on the volume of the olefin charged. Optionally, an organic acid may also be present during the hydrogenation.

According to one embodiment of the invention, the olefin is hydroformylated under conventional temperature and pressure conditions, using conventional $CO/H_2$ oxo-gas, in the presence of cobalt carbonyls as catalysts, and in the absence of water and, thereafter, water in the stated amounts (5 to 15% based on the weight of the olefin) is added to the hydroformylation reaction mixture together with, optionally, an organic acid, and by adjusting the temperature and partial pressure of CO and $H_2$ as may be indicated or convenient, the hydrogenation of the aldehyde formed in the first phase of the process is completed.

Accordoing to another embodiment of the invention, the reaction

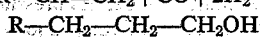

is carried out by subjecting a starting mixture of olefin, $CO/H_2$ oxo-gas, water and, optionally, an organic acid, to hydroformylation under suitable conditions of temperature and pressure, and in the presence of cobalt carbonyls.

In both embodiments of the invention, the reducing hydroformylation reaction is followed by a decobalting treatment and by saponification of the reaction mass with aqueous alkaline solution.

The saponification permits practically total recovery of all esters of the alcohols which are formed, which reflects advantageously on the final yields of the alcohol obtained respect to the amount of olefin present in the starting mixture.

Analysis of the cobalt before and after the hydrogenation phase of the process has established that all of the metal is present in carbonylic form, in which form it functions as the hydrogenation catalyst.

In either modification of the process, the hydroformylation is carried out at temperatures of from 100° C. to 200° C., pressure of from 150 to 300 atm., and $CO/H_2$ ratios of from 0.9:1 to 1.1:1.

Also, in either modification of the invention, the hydrogenation is carried out at temperatures of from 160° C. to 220° C., pressures of from 250 to 350 atm., and $CO/H_2$ ratios of from 0.45:1 to 0.65:1.

The ratio of synthesis gas to olefin may vary but is preferably between 1 and 4 times the stoichiometric value.

The decobalting can be effected by thermal treatment of the mass at low or no partial pressure of CO, by treating it with an inorganic or organic acid, or by treating it with hydrogen under pressure.

Saponification of the mass remaining after the decobalting treatment can be effected by means of aqueous alkaline solutions, such as solutions of sodium hydroxide, ammonia, calcium hydroxide, or other equivalent base, at the boiling temperature of the mass, and for a time period of from 30 to 120 minutes.

Olefins useful in practicing this invention are the alkenes containing from 5 to 15 carbon atoms, including 1-pentene, 2-methylbutene, 2-methylpenetene-1, 4-methylpentene-1, 1-hexene, 1-heptene, 1-octene, dimers and trimers of propylene and of the isomeric butenes, alpha-olefins obtained by cracking from paraffin waxes, and so on.

Organic acids which may be used, optionally, in practicing the invention are primary, secondary and tertiary linear or branched alkylmonocarboxylic acids containing from 2 to 15 carbon atoms. Examples of the useful acids include: acetic acid, propionic acid, n- and iso-butyric acid, pivalic acid, 2-ethyl-hexanoic acid, lauric acid, neoheptanoic acid, neo-octanoic acid, and higher neo-acids. The acids may be used alone, or in mixtures thereof.

The amount of acid used may be from 1% to 5%, preferably from 1% to 3%, by weight, based on the weight of the starting olefin.

The catalysts used are those used conventionally in oxo-reactions, and more particularly cobalt carbonyls or carbonylable cobalt salts. The amount of catalyst used is between 1 and 5 g./liter, with respect to the olefin.

The present process has many practical advantages. One notable advantage is its simplicity. The embodiment in which the starting mixture consists of olefin, $CO/H_2$ oxo-gas, water and, optionally, an organic acid, is particularly simple and economical.

However, in either embodiment of the process, the improvement in the yield of desired alcohol is a substantial economics advantage.

The following examples are given to illustrate the invention and are not intended to be limiting.

EXAMPLE 1

155 g. of 2-methylpentene-1 and sufficient $Co_2(CO)_8$, to give a cobalt concentration with respect to the olefin of 4 g./lt. were introduced into a stainless steel autoclave of 1 liter capacity provided with a stirring system of the rocking cradle type, and equipped with a heating system and a thermal regulating device.

The autoclave was then heated up to 125° C. under pressure of $CO/H_2$ gas in a 1/1 ratio so as to stabilize a final total pressure of 200 atm.

After 100 minutes the absorption was stopped. A sample of 10 g. of raw product was withdrawn from the autoclave and the temperature was raised from 125° C. to 180° C., while the composition of the gas was corrected to change the $CO/H_2$ ratio from 1 to about 0.5. The absorption was then resumed and was stopped again after 35 minutes.

The autoclave was discharged under an inert gas atmosphere, thereby obtaining 218 g. of organic products. Said organic products, after separation therefrom of a 10 g. sample, were decobalted under a pressure of 150 atm. of $H_2$ at 140° C., for 60 minutes. All the cobalt precipitated and, after separation, 213 g. of a liquid free of cobalt, was obtained which, being analyzed, was subjected to saponification by treatment with a 10% aqueous solution of NaOH for 120 minutes at the boiling temperature of the mixture. This resulted in separation of the saponified product into layers, which were separated, an organic layer of 209 g. being obtained.

Chromatographic analysis of the products after the hydroformylation phase (1), the reduction phase (2), decobalting (3) and saponification (4) showed the following results:

(1) $C_7$ aldehydes=64.2%; $C_7$ alcohols=5.2%; formates of $C_7$ alcohols=9.3%;
(2) $C_7$ aldehydes=1.0%; $C_7$ alcohols=59.8%; formates of $C_7$ alcohols=11.1%;
(3) $C_7$ aldehydes=0.8%; $C_7$ alcohols=62.3%; formates of $C_7$ alcohols=9.3%; and
(4) Aldehydes not determinable; $C_7$ alcohols=72.4%; formates of $C_7$ alcohols=2.3%.

From said data, the total yields of $C_7$ alcohols were calculated, taking into account the analysis after the saponification treatment, the percent of $C_7$ aldehydes totally recovered and the percent of $C_7$ alcohol formates totally recovered.

The yield of $C_7$ alcohols obtained after the different stages of the process was as follows:

| | Percent |
|---|---|
| After hydroformylation | 73 |
| After hydrogenation | 72 |
| After decobalting | 71 |
| After saponification | 70 |

By analysis of the catalyst after the hydroformylation and hydrogenation reactions, it was established that all of the cobalt was in the form of cobalt carbonyls.

EXAMPLE 2

Example 1 was repeated, with the difference that the hydroformylation temperature was about 145° C.±2.0, and the time for complete absorption of the $CO/H_2$ gas was 60 minutes.

The reaction proceeded as in Example 1. The yield of $C_7$ alcohols after the hydroformylation, hydrogenation, decobalting and saponification is shown in the following tabulation:

Alcohols $C_7$

| | |
|---|---|
| 1. Hydroformylation | 74 |
| 2. Hydrogenation | 70 |
| 3. Decobalting | 71 |
| 4. Saponification | 70 |

EXAMPLE 3

Proceeding as in Example 2, using a hydroformylation temperature of 145° C., and a 1:1 $CO/H_2$ pressure of 200 atm., the absorption of the gas was completed in 55 minutes.

At the end of the hydroformylation reaction, water was pumped into the autoclave in an amount of 10% by volume of the 2-methylpentene-1 charged to the autoclave initially, and the hydrogenation was carried out at 180° C.±2° C., and a pressure of 250 atm. of a $CO/H_2$ mixture having a ratio of from 0.4 to 0.55.

The end yield of $C_7$ alcohols was 82%. After the hydrogenation, it was found that the cobalt was present in carbonyl form.

EXAMPLE 4

Into an autoclave as described in Example 1, there were introduced 2-methylpentene-1 and 10% by volume of water having cobalt acetate dissolved therein in an amount to provide a Co concentration of 3 g./liter. The hydroformylation phase was carried out at 145° C.±2° C., under a pressure of 200 atm. of a $CO/H_2$ mixture having a ratio of 1:1. The hydrogenation phase which followed was effected at 180° C.±2° C., under 250 atm. pressure of a $CO/H_2$ mixture having a ratio comprised between 0.45 and 0.55.

The reaction mass was then decobalted and saponified as in Example 1.

The end yield of $C_7$ alcohols was 84%.

EXAMPLE 5

In order to demonstrate the influence of water on the reduction of the by-products formed, parallel tests were performed under the conditions of Example 1, with, and without, the addition of 10% of water by volume, based on the olefin(2-methylpentene-1), prior to the reduction (hydrogenation) phase.

Analysis of the raw products after the hydroformylation, hydrogenation and saponification gave the results tabulated in Table I below:

TABLE I

| | Aldehyde $C_7$ | Alcohol $C_7$ | Formates of alcohol $C_7$ | Compounds with a higher number of C atoms |
|---|---|---|---|---|
| Without $H_2O$: | | | | |
| After hydroformylation | 70.9 | 5.0 | 4.7 | 6.4 |
| After hydrogenation | Not determinable | 56.7 | 13.9 | 24.0 |
| After saponification | do | 70.9 | 1.3 | 24.3 |
| With $H_2O$: | | | | |
| After hydroformylation | 73.7 | 3.0 | 3.0 | 7.4 |
| After hydrogenation | 2.4 | 75.1 | 8.3 | 10.2 |
| After saponification | Not determinable | 83.8 | 0.2 | 11.2 |

EXAMPLE 6

Using the apparatus described in Example 1, a number of tests were carried out, some in the presence, and some in the absence of water and an organic acid.

At the end of the hydroformylation phase, the raw products were decobalted under $H_2$ pressure (at 70 atmospheres), at 180° C., for 30 minutes, and were then saponified under the conditions described in Example 1.

The conditions, and the results, are tabulated in Table II.

The product obtained (equal to 231 g.) showed, on analysis, the following results:

TABLE II

| | Reducing hydroformylation | | | | | Acid | | GCL analysis after saponification | | | | Percent b.w. | |
|---|---|---|---|---|---|---|---|---|---|---|---|---|---|
| Test | Temp., °C. | Press. atm. | CO/H₂ ratio by vol. | Co(CO)₈ as Co, g./lt. | H₂O, Percent vol. with respect to the olefin | Type | Percent b.w. with respect to the olefin | Aldehyde C₇ percent b.w. | Alcohol C₇ percent b.w. | Alcohol C₇ formates | Products with higher number of C atoms | balance of organic phase saponification | Final yield, percent of C₇ alcohols |
| 1 | 180 | 280 | 0.45 | 4.0 | | | | Not determinable. | 67.5 | 0.2 | 22.0 | 98 | 65 |
| 2 | 180 | 280 | 0.50 | 2.0 | | | | do | 68.5 | 0.2 | 20.9 | 97 | 65.5 |
| 3 | 180 | 280 | 0.55 | 4.0 | 5 | | | do | 73.7 | 0.2 | 19.8 | 98 | 71.0 |
| 4 | 180 | 280 | 0.50 | 4.0 | 5 | Acetic | 1.2 | do | 79.1 | 0.2 | 12.6 | 98 | 77.0 |
| 5 | 180 | 280 | 0.55 | 4.0 | 5 | Pivalic | 2.0 | do | 73.9 | 0.4 | 17.9 | 99 | 75 |
| 6 | 200 | 280 | 0.56 | 2.0 | 5 | do | 2.0 | 1.5 | 77.0 | 0.2 | 13.0 | 99 | 80 |
| 7[1] | 200 | 280 | 0.62 | 2.0 | 5 | do | 2.0 | Not determinable. | 80.7 | 0.3 | 12.5 | 99 | 81 |

[1] In this test the decobalting was carried out by means of a treatment with an aqueous solution of H₂SO₄ at 10% for 60 minutes at a temperature of 87° C., under nitrogen pressure and then separating an organic phase free of cobalt.

EXAMPLE 7

Into an autoclave as described in Example 1, there were introduced 4-methylpentene-1 and sufficient $Co_2(CO)_8$ to give a Co concentration of 2 g./liter.

The mixture was then heated to 200° C. under pressure (300 atm.) of a $CO/H_2$ mixture having a ratio of 1. Said temperature and pressure were maintained throughout the reaction.

The contents of the autoclave were then discharged, and the raw product was analyzed. The gas liquid chromatographic analysis gave the following results:

| | Percent |
|---|---|
| Aldehydes C₇, total | 35.0 |
| Alcohols C₇, total | 11.2 |
| Formates of alcohols C₇ | 8.8 |
| Products having a higher number of C atoms | 39.4 |

By operating under the same conditions, but adding to the starting olefine 5% by volume of water and 2.0 by weight of pivalic acid, the analysis of organic products gave the following results:

| | Percent |
|---|---|
| Aldehydes C₇, total | 1.1 |
| Alcohols C₇, total | 68.8 |
| Formates of alcohols C₇ | 5.2 |
| Products having a higher number of C atoms | 12.8 |

Neither thermal decobalting at 180° C. for 60 minutes, under a pressure of 70 atm. of $H_2$ and in the presence, in the first case, of 5% water added in this phase, nor decobalting with the addition of aqueous $H_2SO_4$, at the boiling point for 60 minutes, under an atmosphere of an inert gas, significantly changed the analytical results.

EXAMPLE 8

162 g. of 4-methylpentene-1, a sufficient amount of aqueous $Co(CH_3COO)_2 \cdot 2H_2O$ to give a Co concentration of 3.0 g./lt. and 10% by volume of $H_2O$ with respect to the olefin, were introduced into the autoclave.

It was washed with a mixture of Co and $H_2$ having a ratio of 1, and then the hydroformylation was carried out at 145° C. under 200 atm. of the same gaseous mixture under said temperature and pressure conditions.

After 35 minutes the absorption stopped. The temperature was then raised to 180° C., at the same time correcting the pressure to 280 atm., and the $CO/H_2$ ratio to 0.5. The reaction was then carried on until the absorption stopped again. The mixture was then decobalted with $H_2$ at 70 atm. and at 180° C.

| | Percent b.w. |
|---|---|
| Products with a lower number of carbon atoms | 2.1 |
| Aldehydes C₇, total | 1.3 |
| Alcohols C₇, total | 66.5 |
| Formates of alcohols C₇ | 12.3 |
| Products with a higher number of carbon atoms | 17.1 |

The product was then saponified with an aqueous solution of NaOH at the boiling point, as described in Example 1 and, after separation of the aqueous phase, an organic phase was obtained which contained 176 g. of total alcohols C₇, in a yield of 79% with respect to the olefin.

EXAMPLE 9

177 g. of an olefin mixture having from 7 to 9 carbon atoms and consisting for 85% of alpha-olefins and for 13% of internal olefins having the following distributions: 27% of olefins C₇, 42% of olefins C₈ and 29% of olefins C₉, were subjected to the hydroformylation reaction at 145° C. and under 200 atm. of the $CO/H_2$ mixture having the ratio 1, using as a cobalt salt an aqueous acetate solution, as in Example 8.

At the end of the absorption, the temperature was raised to 180° C. and the total pressure to 280 atm. varying, at the same time the ratio between CO and $H_2$ from 1 to 0.5.

Thereupon the absorption started again and after it stopped the autoclave was quickly cooled down, discharged and the product was decobalted with an aqueous solution of $H_2SO_4$ for 60 minutes at the boiling temperature. The cobalt separated completely and the organic phase, amounting to 230 g. showed, on analysis, the following chemical numbers:

| | |
|---|---|
| Carbonyl number | 30 |
| Hydroxyl number | 286 |
| Saponification number | 31 |

After the saponification under the conditions already described in the preceding examples, the saponification number dropped to a value of 2 and the hydroxyl number increased to 315.

As will be evident, changes in details may be made in practicing the invention, without departing from its spirit. Therefore, we intend to include in the scope of the appended claims all such modifications and variations as will be obvious to those skilled in the art from the description and working examples given herein.

What is claimed is:

1. A process for the synthesis of alcohols, by oxo-reaction, and starting with a mixture of alkenes containing from 5 to 15 carbon atoms, CO, and $H_2$, which process comprises (1) a hydroformylation phase carried out in the presence of a cobalt carbonyl at a temperature of from 100° C. to 200° C., a pressure of from 150 to 300 atm. and with $CO/H_2$ ratios of from 0.9:1 to 1.1/1; (2) a hydrogenation phase carried out in the presence of the same catalyst as in (1), from 5% to 15% by weight of water based on the weight of the alkenes charged to the hydroformylation phase, and from 1% to 5% by weight, on the weight of the alkenes charged to the hydroformylation phase, of an organic acid selected from the group consisting of primary, secondary and tertiary linear and branched alkyl carboxylic acids containing from 2 to 15 carbon atoms, said hydrogenation phase being carried out at a temperature of from 160° C. to 220° C. and a pressure of from 250 to 350 atm. and with $CO/H_2$ ratios of from 0.45:1 to 0.65:1; (3) a decobalting treatment of the product resulting from the hydrogenation phase; and (4) alkaline saponification of the decobalted product.

2. The process according to claim 1, in which the amount of the organic acid used is from 1% to 3% by weight, based on the weight of the alkenes charged to the hydroformylation phase.

3. The process according to claim 1, in which the water, and the organic acid, are added after the hydroformylation phase.

4. The process according to claim 1 in which the water, and the organic acid, are added with the hydroformylating reactants.

5. The process according to claim 1, in which the alkaline saponification phase is carried out at boiling temperature for a period of from 30 to 120 minutes.

6. The process according to claim 5, in which an aqueous solution of sodium hydrate is used as the saponifying agent.

7. The process according to claim 5, in which an aqueous solution of ammonia is used as the saponifying agent.

8. The process according to claim 5, in which an aqueous solution of calcium hydrate is used as the saponifying agent.

References Cited

UNITED STATES PATENTS

| 2,564,130 | 8/1951 | Schreyer | 260—638 HF |
| 2,697,731 | 12/1954 | Nagel | 260—638 HF |
| 3,113,974 | 12/1963 | Heimsch et al. | 260—638 HF |
| 3,234,146 | 2/1966 | Noll et al. | 260—638 HF |
| 3,330,875 | 7/1967 | Cull et al. | 260—638 HF |
| 3,182,090 | 5/1965 | Mertzweiller et al. | 260—638 HF |

OTHER REFERENCES

Lascary, "The Journal of the American Oil Chemists' Society," vol. 29 (1952), pp. 362–6.

JOSEPH E. EVANS, Primary Examiner

U.S. Cl. X.R.

260—497 R, 604 HF, 643 E, 643 G

UNITED STATES PATENT OFFICE
CERTIFICATE OF CORRECTION

Patent No. 3,819,727      Dated June 25, 1974

Inventor(s) Giuseppe FERRARI et al

It is certified that error appears in the above-identified patent and that said Letters Patent are hereby corrected as shown below:

Col. 2, line 11, the word " with " should appear before " respect ".

" line 19, after " 220°C., " the word " pressure " should be - - - pressures - - -, between lines 42 and 43, the following paragraph should appear:

- - - As already stated the amount of water used is from 5% to 15% by volume, based on the volume of the starting olefin. Good results have been obtained using 10% of water by volume. - - -

Col. 6, Table II, in the heading of the next to last column from the right, the word - - - after - - - should appear between " phase " and " saponification ";

Signed and sealed this 21st day of January 1975.

(SEAL)
Attest:

McCOY M. GIBSON JR.
Attesting Officer

C. MARSHALL DANN
Commissioner of Patents